United States Patent
Payne (10) Patent No.: US 9,178,192 B2
(45) Date of Patent: Nov. 3, 2015

(54) BATTERY MODULE AND METHOD FOR MANUFACTURING THE BATTERY MODULE

(75) Inventor: Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 455 days.

(21) Appl. No.: 13/106,966

(22) Filed: May 13, 2011

(65) Prior Publication Data

US 2012/0288745 A1 Nov. 15, 2012

(51) Int. Cl.

| H01M 2/00 | (2006.01) |
|---|---|
| H01M 2/04 | (2006.01) |
| H01M 2/06 | (2006.01) |
| H01M 2/08 | (2006.01) |
| H01M 10/04 | (2006.01) |

(52) U.S. Cl.
CPC ........ *H01M 2/08* (2013.01); *H01M 2/06* (2013.01); *H01M 10/0413* (2013.01); *Y10T 29/4911* (2015.01); *Y10T 29/49108* (2015.01)

(58) Field of Classification Search
CPC ....... H01M 2/00; H01M 2/0245; H01M 2/04; H01M 2/06
See application file for complete search history.

(56) References Cited

U.S. PATENT DOCUMENTS

| 2,273,244 A | 2/1942 | Ambruster |
|---|---|---|
| 3,503,558 A | 3/1970 | Galiulo et al. |
| 3,522,100 A | 7/1970 | Lindstrom |
| 4,390,841 A | 6/1983 | Martin et al. |
| 4,396,689 A | 8/1983 | Grimes et al. |
| 4,409,304 A | 10/1983 | Gerard et al. |
| 5,071,652 A | 12/1991 | Jones et al. |
| 5,270,131 A | 12/1993 | Diethelm et al. |
| 5,346,786 A | 9/1994 | Hodgetts |
| 5,354,630 A | 10/1994 | Earl et al. |
| 5,364,711 A | 11/1994 | Yamada et al. |
| 5,385,793 A | 1/1995 | Tiedemann et al. |

(Continued)

FOREIGN PATENT DOCUMENTS

| CN | 1512518 A | 7/2004 |
|---|---|---|
| EP | 0736226 B1 | 3/1999 |

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — Barbara Gilliam
*Assistant Examiner* — Angela Martin
(74) *Attorney, Agent, or Firm* — Buckert Patent & Trademark Law Firm, PC; John F. Buckert (57) ABSTRACT

A battery module and a related method are provided. The module includes battery cells having electrical terminals extending from battery portions. The module further includes an interconnect board having apertures for receiving the electrical terminals therethrough, and an elastomeric layer having apertures extending therethrough. The elastomeric layer is disposed proximate to the interconnect board such that the electrical terminals extend through the apertures of the interconnect board and further extend through the apertures of the elastomeric layer. The module further includes a potting compound disposed on the elastomeric layer such that the layer prevents the potting compound from contacting the battery portions.

13 Claims, 12 Drawing Sheets

(56) References Cited

U.S. PATENT DOCUMENTS

| | | |
|---|---|---|
| 5,487,955 A | 1/1996 | Korall et al. |
| 5,487,958 A | 1/1996 | Tura |
| 5,503,948 A | 4/1996 | Mackay et al. |
| 5,510,203 A | 4/1996 | Hamada et al. |
| 5,520,976 A | 5/1996 | Giannetti et al. |
| 5,561,005 A | 10/1996 | Omaru et al. |
| 5,589,290 A | 12/1996 | Klink et al. |
| 5,606,242 A | 2/1997 | Hull et al. |
| 5,639,571 A | 6/1997 | Waters et al. |
| 5,652,502 A | 7/1997 | van Phuoc et al. |
| 5,658,682 A | 8/1997 | Usuda et al. |
| 5,663,007 A | 9/1997 | Ikoma et al. |
| 5,693,432 A | 12/1997 | Matsumoto |
| 5,756,227 A | 5/1998 | Suzuki et al. |
| 5,796,239 A | 8/1998 | can Phuoc et al. |
| 5,825,155 A | 10/1998 | Ito et al. |
| 5,856,041 A | 1/1999 | Inoue et al. |
| 5,982,403 A | 11/1999 | Inagaki |
| 6,016,047 A | 1/2000 | Notten et al. |
| 6,023,146 A | 2/2000 | Casale et al. |
| 6,099,986 A | 8/2000 | Gauthier et al. |
| 6,117,584 A | 9/2000 | Hoffman et al. |
| 6,121,752 A | 9/2000 | Kitahara et al. |
| 6,257,328 B1 | 7/2001 | Fujiwara et al. |
| 6,261,719 B1 | 7/2001 | Ikeda et al. |
| 6,353,815 B1 | 3/2002 | Vilim et al. |
| 6,362,598 B2 | 3/2002 | Laig-Horstebrock et al. |
| 6,406,812 B1 | 6/2002 | Dreulle et al. |
| 6,413,678 B1 | 7/2002 | Hamamoto et al. |
| 6,422,027 B1 | 7/2002 | Coates, Jr. et al. |
| 6,441,586 B1 | 8/2002 | Tate, Jr. et al. |
| 6,448,741 B1 | 9/2002 | Inui et al. |
| 6,462,949 B1 | 10/2002 | Parish, IV et al. |
| 6,475,659 B1 | 11/2002 | Heimer |
| 6,515,454 B2 | 2/2003 | Schoch |
| 6,521,363 B1 | 2/2003 | Yeh |
| 6,534,954 B1 | 3/2003 | Plett |
| 6,555,264 B1 | 4/2003 | Hamada et al. |
| 6,563,318 B2 | 5/2003 | Kawakami et al. |
| 6,709,783 B2 | 3/2004 | Ogata et al. |
| 6,724,172 B2 | 4/2004 | Koo |
| 6,771,502 B2 | 8/2004 | Getz, Jr. et al. |
| 6,773,301 B1 | 8/2004 | Chaskin |
| 6,780,538 B2 | 8/2004 | Hamada et al. |
| 6,821,671 B2 | 11/2004 | Hinton et al. |
| 6,829,562 B2 | 12/2004 | Sarfert |
| 6,832,171 B2 | 12/2004 | Barsoukov et al. |
| 6,876,175 B2 | 4/2005 | Schoch |
| 6,886,249 B2 | 5/2005 | Smalc |
| 6,892,148 B2 | 5/2005 | Barsoukov et al. |
| 6,927,554 B2 | 8/2005 | Tate, Jr. et al. |
| 6,943,528 B2 | 9/2005 | Schoch |
| 6,967,466 B2 | 11/2005 | Koch |
| 6,982,131 B1 | 1/2006 | Hamada et al. |
| 7,012,434 B2 | 3/2006 | Koch |
| 7,026,073 B2 | 4/2006 | Ueda et al. |
| 7,039,534 B1 | 5/2006 | Ryno et al. |
| 7,061,246 B2 | 6/2006 | Dougherty et al. |
| 7,072,871 B1 | 7/2006 | Tinnemeyer |
| 7,074,517 B2 | 7/2006 | Higashino |
| 7,098,665 B2 | 8/2006 | Laig-Hoerstebrock |
| 7,109,685 B2 | 9/2006 | Tate, Jr. et al. |
| 7,126,312 B2 | 10/2006 | Moore |
| 7,147,045 B2 | 12/2006 | Quisenberry et al. |
| 7,197,487 B2 | 3/2007 | Hansen et al. |
| 7,199,557 B2 | 4/2007 | Anbuky et al. |
| 7,229,327 B2 | 6/2007 | Zhao et al. |
| 7,250,741 B2 | 7/2007 | Koo et al. |
| 7,251,889 B2 | 8/2007 | Kroliczek et al. |
| 7,253,587 B2 | 8/2007 | Meissner |
| 7,264,902 B2 | 9/2007 | Horie et al. |
| 7,270,576 B2 | 9/2007 | Kim et al. |
| 7,270,912 B2 | 9/2007 | Oogami |
| 7,294,020 B2 | 11/2007 | Zhao et al. |
| 7,315,789 B2 | 1/2008 | Plett |
| 7,321,220 B2 | 1/2008 | Plett |
| 7,327,147 B2 | 2/2008 | Koch |
| 7,400,115 B2 | 7/2008 | Plett |
| 7,446,504 B2 | 11/2008 | Plett |
| 7,479,758 B2 | 1/2009 | Moon |
| 7,507,124 B2 | 3/2009 | Kim |
| 7,518,339 B2 | 4/2009 | Schoch |
| 7,521,895 B2 | 4/2009 | Plett |
| 7,525,285 B2 | 4/2009 | Plett |
| 7,563,137 B1 | 7/2009 | Koetting et al. |
| 7,578,702 B1 | 8/2009 | Tom et al. |
| 7,583,059 B2 | 9/2009 | Cho |
| 7,589,532 B2 | 9/2009 | Plett |
| 7,642,746 B2 | 1/2010 | Kim et al. |
| 7,656,122 B2 | 2/2010 | Plett |
| 7,723,957 B2 | 5/2010 | Plett |
| 7,762,848 B2 | 7/2010 | Koetting et al. |
| 7,794,868 B2 | 9/2010 | Yang |
| 7,883,793 B2 | 2/2011 | Niedzwiecki et al. |
| 8,035,986 B2 | 10/2011 | Koetting et al. |
| 2001/0046624 A1 | 11/2001 | Goto et al. |
| 2001/0049055 A1 | 12/2001 | Saito |
| 2003/0027039 A1 | 2/2003 | Benson et al. |
| 2003/0082440 A1 | 5/2003 | Mrotek et al. |
| 2003/0184307 A1 | 10/2003 | Kozlowski et al. |
| 2003/0213121 A1 | 11/2003 | Rouillard et al. |
| 2004/0043663 A1 | 3/2004 | Ikeda et al. |
| 2005/0026014 A1 | 2/2005 | Fogaing et al. |
| 2005/0031945 A1 | 2/2005 | Morita et al. |
| 2005/0100786 A1 | 5/2005 | Ryu et al. |
| 2005/0127874 A1 | 6/2005 | Lim et al. |
| 2005/0130033 A1 | 6/2005 | Iwamura et al. |
| 2005/0134038 A1 | 6/2005 | Walsh |
| 2006/0100833 A1 | 5/2006 | Plett |
| 2006/0127754 A1 | 6/2006 | Hamada et al. |
| 2006/0177733 A1 | 8/2006 | Ha et al. |
| 2006/0194101 A1 | 8/2006 | Ha et al. |
| 2006/0234558 A1 | 10/2006 | Li |
| 2006/0246781 A1 | 11/2006 | Yoon et al. |
| 2007/0037051 A1 | 2/2007 | Kim et al. |
| 2007/0087266 A1 | 4/2007 | Bourke et al. |
| 2007/0238018 A1 | 10/2007 | Lee et al. |
| 2008/0124617 A1 | 5/2008 | Bjork |
| 2008/0169788 A1* | 7/2008 | Bobbin et al. ............... 320/135 |
| 2008/0254356 A1 | 10/2008 | Liersch et al. |
| 2009/0029239 A1 | 1/2009 | Koetting et al. |
| 2009/0139781 A1* | 6/2009 | Straubel ................... 180/65.1 |
| 2009/0186265 A1 | 7/2009 | Koetting et al. |
| 2009/0325042 A1 | 12/2009 | Koetting et al. |
| 2009/0325051 A1 | 12/2009 | Niedzwiecki et al. |
| 2009/0325052 A1 | 12/2009 | Koetting et al. |
| 2009/0325053 A1 | 12/2009 | Koetting et al. |
| 2009/0325054 A1 | 12/2009 | Payne et al. |
| 2009/0325055 A1 | 12/2009 | Koetting et al. |
| 2010/0062329 A1 | 3/2010 | Muis |
| 2010/0086842 A1 | 4/2010 | Yang |
| 2010/0105258 A1 | 4/2010 | Koetting et al. |
| 2010/0151312 A1 | 6/2010 | Kim et al. |
| 2010/0247998 A1 | 9/2010 | Hostler et al. |
| 2010/0266883 A1 | 10/2010 | Koetting et al. |
| 2010/0275619 A1 | 11/2010 | Koetting et al. |
| 2010/0276132 A1 | 11/2010 | Payne |
| 2010/0279152 A1 | 11/2010 | Payne |
| 2010/0279153 A1 | 11/2010 | Payne |
| 2010/0279154 A1 | 11/2010 | Koetting et al. |
| 2011/0027625 A1 | 2/2011 | Payne |
| 2011/0027640 A1 | 2/2011 | Gadawski et al. |
| 2011/0052959 A1 | 3/2011 | Koetting et al. |
| 2011/0293994 A1 | 12/2011 | Casoli |
| 2012/0088140 A1* | 4/2012 | Kardasz et al. ............... 429/120 |
| 2013/0029204 A1 | 1/2013 | Khakhalev et al. |
| 2013/0052503 A1 | 2/2013 | Payne |
| 2013/0052511 A1 | 2/2013 | Khakhalev |
| 2013/0216878 A1 | 8/2013 | Merriman et al. |

FOREIGN PATENT DOCUMENTS

| | | |
|---|---|---|
| EP | 0673553 B1 | 2/2001 |
| EP | 1089373 A | 4/2001 |

(56) References Cited

FOREIGN PATENT DOCUMENTS

| | | | |
|---|---|---|---|
| EP | 1435675 | A1 | 7/2004 |
| EP | 1505670 | A2 | 2/2005 |
| GB | 2084390 | A | 4/1982 |
| JP | 4056079 | A | 2/1992 |
| JP | 8138735 | A | 5/1996 |
| JP | 8222280 | A | 8/1996 |
| JP | 9129213 | A | 5/1997 |
| JP | 09-219213 | | 8/1997 |
| JP | 10199510 | A | 7/1998 |
| JP | 11066949 | A | 3/1999 |
| JP | 11191432 | A | 7/1999 |
| JP | 2000123802 | A | 4/2000 |
| JP | 2000164200 | A | 6/2000 |
| JP | 2000315492 | | 11/2000 |
| JP | 2002252036 | A | 9/2002 |
| JP | 2003219572 | A | 7/2003 |
| JP | 2003282044 | A | 10/2003 |
| JP | 2004055492 | A | 2/2004 |
| JP | 2004178860 | A | 6/2004 |
| JP | 2005-126315 | | 5/2005 |
| JP | 2006156171 | | 6/2006 |
| JP | 2007265945 | A | 10/2007 |
| JP | 2008-080995 | | 4/2008 |
| KR | 20020051742 | A | 6/2002 |
| KR | 20020064366 | A | 8/2002 |
| KR | 20060110408 | A | 10/2006 |
| KR | 20070057662 | A | 6/2007 |
| KR | 100765659 | B1 | 10/2007 |
| KR | 20070100555 | A | 10/2007 |
| KR | 20080027504 | A | 3/2008 |
| KR | 20080027505 | A | 3/2008 |
| KR | 20080036258 | A | 4/2008 |
| KR | 20080047641 | A | 5/2008 |
| KR | 100889241 | B1 | 3/2009 |
| KR | 20090095949 | A | 9/2009 |
| KR | 100921346 | B1 | 10/2009 |
| KR | 100996957 | B | 1/2010 |
| KR | 101042611 | B | 1/2010 |
| KR | 20100003146 | A | 1/2010 |
| KR | 101050318 | B | 10/2010 |
| WO | 0030190 | A | 5/2000 |
| WO | WO 00/30190 | * | 5/2000 |
| WO | 03071616 | A2 | 8/2003 |
| WO | WO 03/071616 | * | 8/2003 |
| WO | WO03/071616 | A2 | 8/2003 |
| WO | 2011027817 | A1 | 3/2011 |

OTHER PUBLICATIONS

European Supplementary Search Report dated Aug. 28, 2009 for EP Application No. 04774658.
International Search Report for International application No. PCT/KR2005/003755 dated Mar. 2, 2006.
International Search Report for PCT/KR2009/000258 dated Aug. 28, 2009.
International Search report for PCT/KR2009/003434 dated Jan. 18, 2010.
Machine translation of JP 08-138735.
Machine translation of JP 10-199510.
Machine translation of JP 2000 260469.
U.S. Appl. No. 12/794,949, filed Jun. 7, 2010 entitled Battery Module and Methods for Bonding a Cell Terminal of a Battery to an Interconnect Member.
U.S. Appl. No. 12/857,908, filed Aug. 17, 2010 entitled Battery Cell Assemblies.
U.S. Appl. No. 12/861,364, filed Aug. 23, 2010 entitled Connecting Assembly.
U.S. Appl. No. 12/861,375, filed Aug. 23, 2010 entitled Battery System and Manifold Assembly Having a Manifold Member and a Connecting Fitting.
U.S. Appl. No. 12/861,381, filed Aug. 23, 2010 entitled End Cap.
U.S. Appl. No. 12/861,394, filed Aug. 23, 2010 entitled Battery System and Manifold Assembly With Two Manifold Members Removably Coupled Together.
U.S. Appl. No. 12/868,111, filed Aug. 25, 2010 entitled Battery Module and Methods for Bonding Cell Terminals of Battery Cells Together.
U.S. Appl. No. 13/073,000, filed Mar. 28, 2011 entitled Battery Disconnect Unit and Method of Assembling the Battery Disconnect Unit.
U.S. Appl. No. 13/076,774, filed Mar. 31, 2011 entitled Battery Pack Having Liquid Leak Detection System.
International Search Report for International Patent Application No. PCT/KR2009/003438 dated Jan. 22, 2010.
International Search Report for International Patent Application No. PCT/KR2009/003440 dated Jan. 22, 2010.
U.S. Appl. No. 13/397,782, filed on Feb. 16, 2012 entitled Battery Cell Interconnect and Voltage Sensing Assembly and Method of Manufacturing the Assembly.
International Search Report for International application No. PCT/KR2012/006812 dated Feb. 27, 2013.
International Search Report for International application No. PCT/KR2012/006813 dated Feb. 14, 2013.
International Search Report for International application No. PCT/KR2013/001174 dated May 13, 2013.
U.S. Appl. No. 14/246,178, filed on Apr. 7, 2014 entitled Battery Cell Interconnect and Voltage Sensing Assembly and a Battery Module.
U.S. Appl. No. 14/617,230, filed on Feb. 9, 2015 entitled Battery Module and Method of Coupling First and Second Electrical Terminals of First and Second Battery Cells to a Voltage Sense Member of an Interconnect Assembly.
U.S. Appl. No. 14/617,344, filed on Feb. 9, 2015 entitled Battery Module and Method of Coupling First and Second Electrical Terminals of First and Second Battery Cells to First and Second Voltage Sense Members of an Interconnect Assembly.

* cited by examiner

BATTERY MODULE AND METHOD FOR MANUFACTURING THE BATTERY MODULE

BACKGROUND

Battery modules have been designed with battery cells having cell tabs encapsulated in a potting compound. The inventors herein have recognized that a drawback with the above battery modules is that when the potting compound is being applied around the battery cell tabs, the potting compound can leak in the battery module and undesirably contact battery portions or battery pouches. Also, the potting compound can undesirably fill in cooling passages between the battery portions.

SUMMARY

A battery module in accordance with an exemplary embodiment is provided. The battery module includes a plurality of battery cells having electrical terminals extending from battery portions. The battery module further includes an interconnect board having a plurality of apertures extending therethrough for receiving the electrical terminals therethrough. The battery module further includes an elastomeric layer having a plurality of apertures extending therethrough. The elastomeric layer is disposed proximate to the interconnect board such that the electrical terminals extend through the plurality of apertures of the interconnect board and further extend through the plurality of apertures of the elastomeric layer. The battery module further includes a potting compound disposed on the elastomeric layer such that the elastomeric layer prevents the potting compound from contacting the battery portions.

A method of manufacturing a battery module in accordance with another exemplary embodiment is provided. The method includes disposing a plurality of battery cells in a plurality of frame members. The plurality of battery cells have electrical terminals extending from battery portions. The electrical terminals extend through apertures in the frame members. The method further includes disposing an interconnect board proximate to the plurality of battery cells such that a plurality of apertures extending through the interconnect board receive the electrical terminals therethrough. The method further includes disposing an elastomeric layer proximate to the interconnect board such that the electrical terminals extend through the plurality of apertures of the interconnect board further extend through a plurality of apertures of the elastomeric layer. The method further includes disposing a potting compound on the elastomeric layer and the electrical terminals such that the elastomeric layer prevents the potting compound from contacting the battery portions.

DETAILED DESCRIPTION

Referring to FIGS. 1-4, a battery module 10 having an elastomeric layer 100 in accordance with an exemplary embodiment is provided. The battery module 10 includes a plurality of battery cells 20, a plurality of frame members 50, an interconnect carrier 80, an interconnect board 90, the elastomeric layer 100, and a potting compound 110.

Referring to FIGS. 5-8, the plurality of battery cells 20 are each configured to generate an operational voltage. In one exemplary embodiment, each of the battery cells 20 are pouch-type lithium-ion battery cells. Of course, other types of battery cells known to those skilled in the art could be utilized. Also, in an exemplary embodiment, the plurality of battery cells 20 are electrically coupled in series to one another. In an alternative embodiment, the plurality of battery cells 20 could be electrically coupled in parallel to one another. Each of the plurality of battery cells 20 includes a battery portion 130 with electrical terminals 132, 134 extending from the battery portion 130. In one exemplary embodiment, the battery portion 130 is a pouch that contains active elements of the battery cell.

Figure 1:
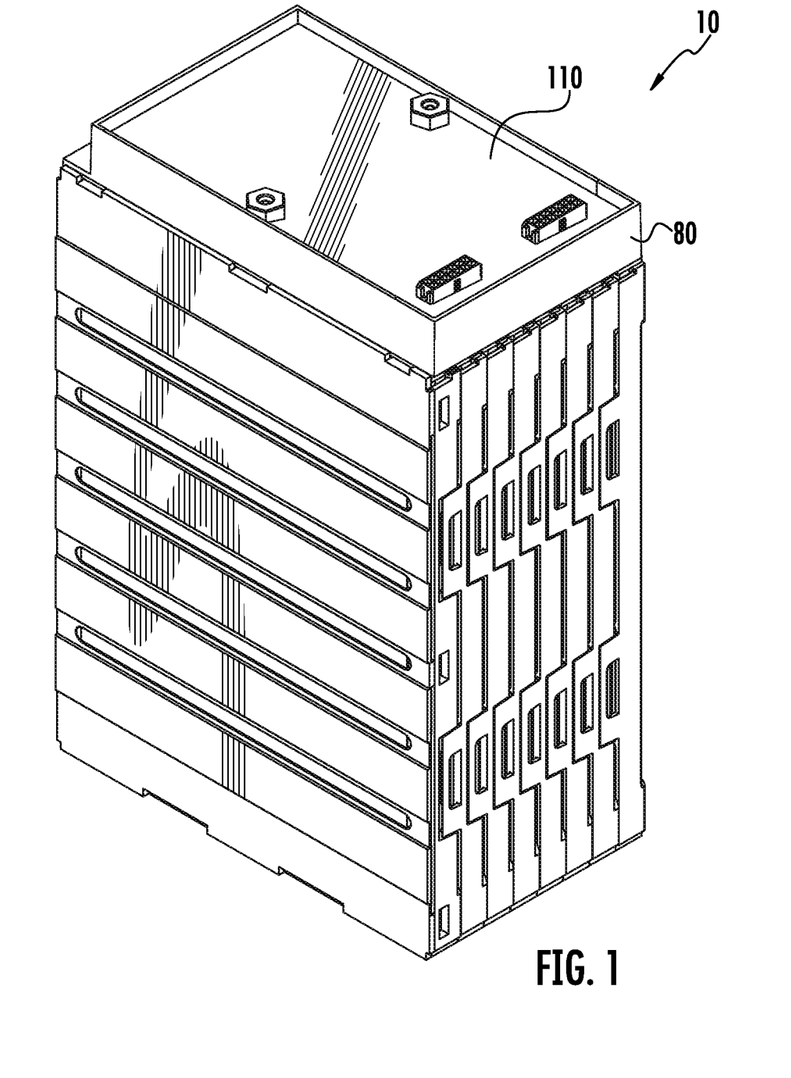
FIG. 1 is a schematic of a battery module in accordance with an exemplary embodiment.
Figure 2:
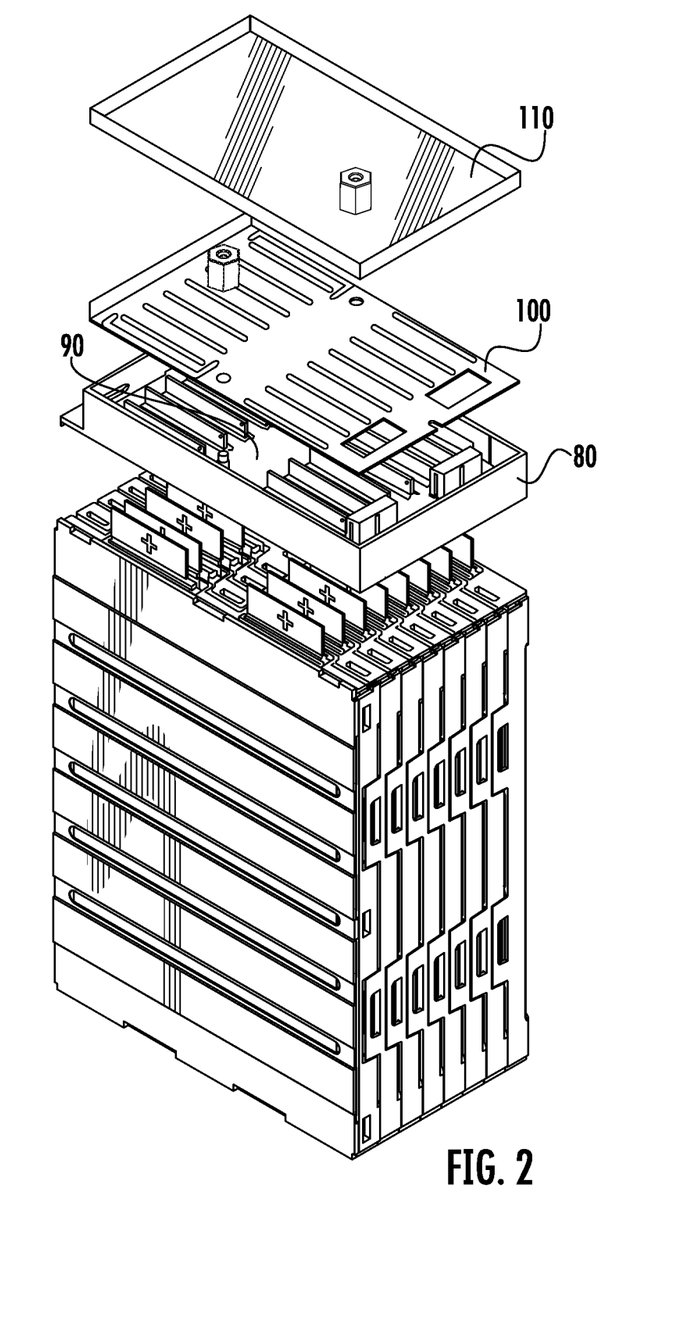
FIG. 2 is an exploded view of the battery module of FIG. 1.
Figure 3:
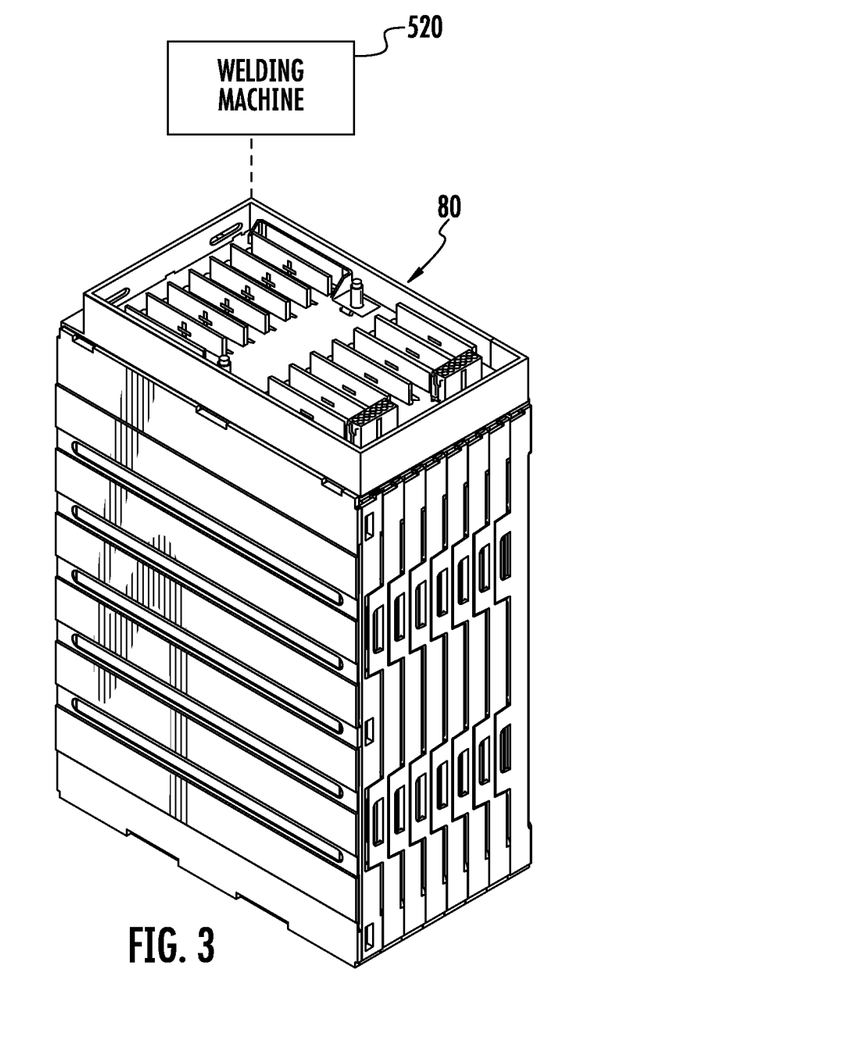
FIG. 3 is a schematic of a portion of the battery module of FIG. 1.
Figure 4:
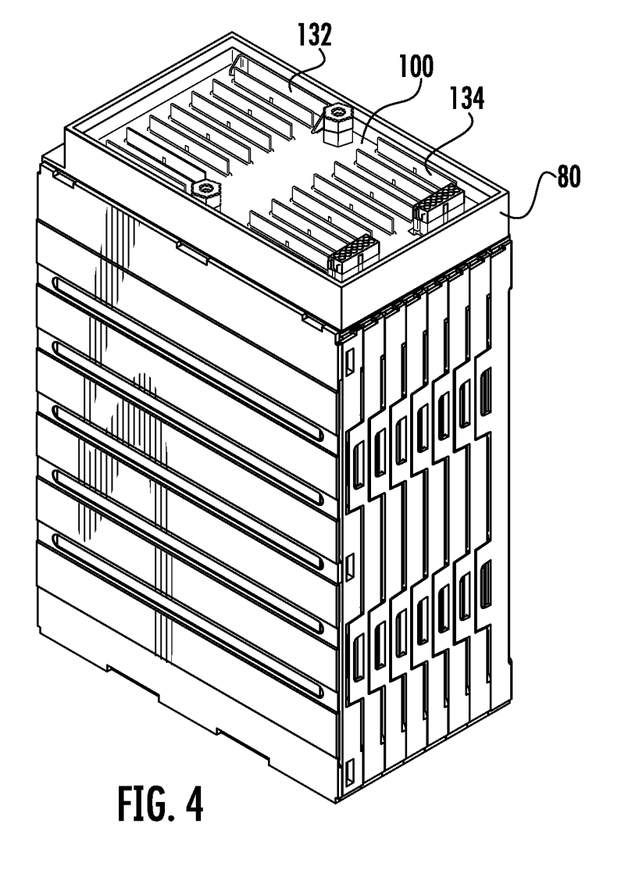
FIG. 4 is another schematic of a portion of the battery module of FIG. 1.
Figure 5:
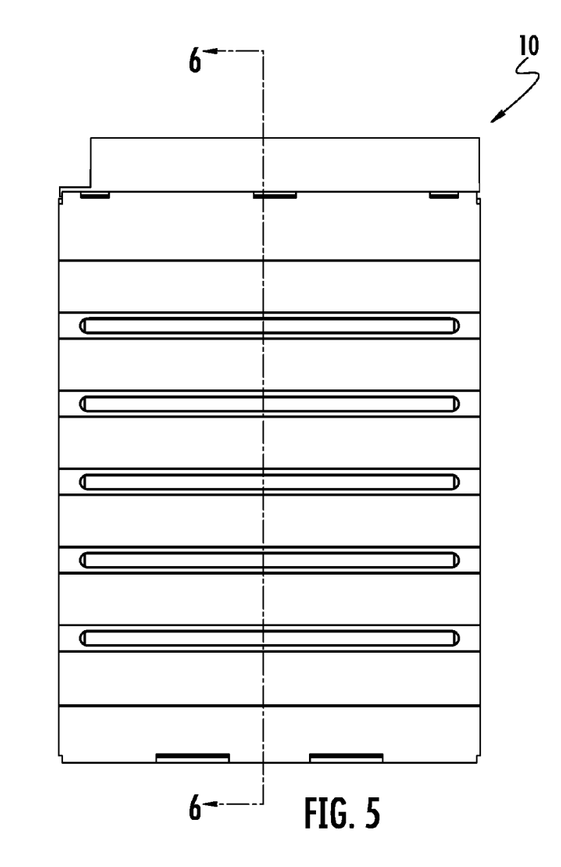
FIG. 5 is a side view of the battery module of FIG. 1.
Figure 6:
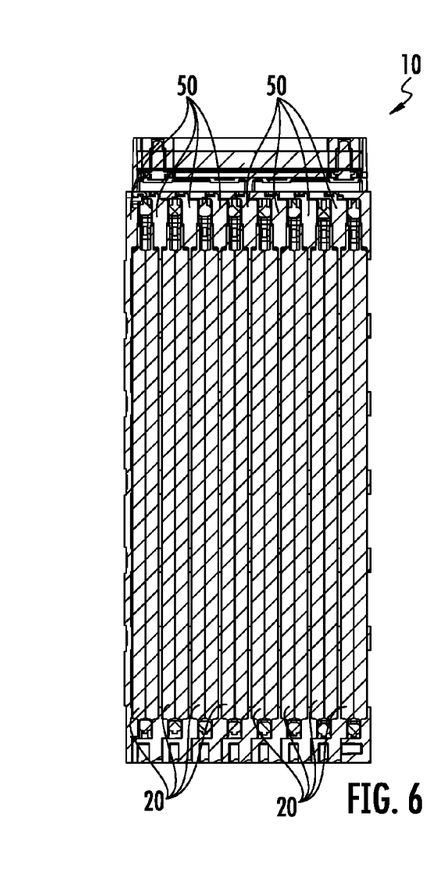
FIG. 6 is a cross-sectional view of the battery module of FIG. 5 taken along line 6-6.
Figure 7:
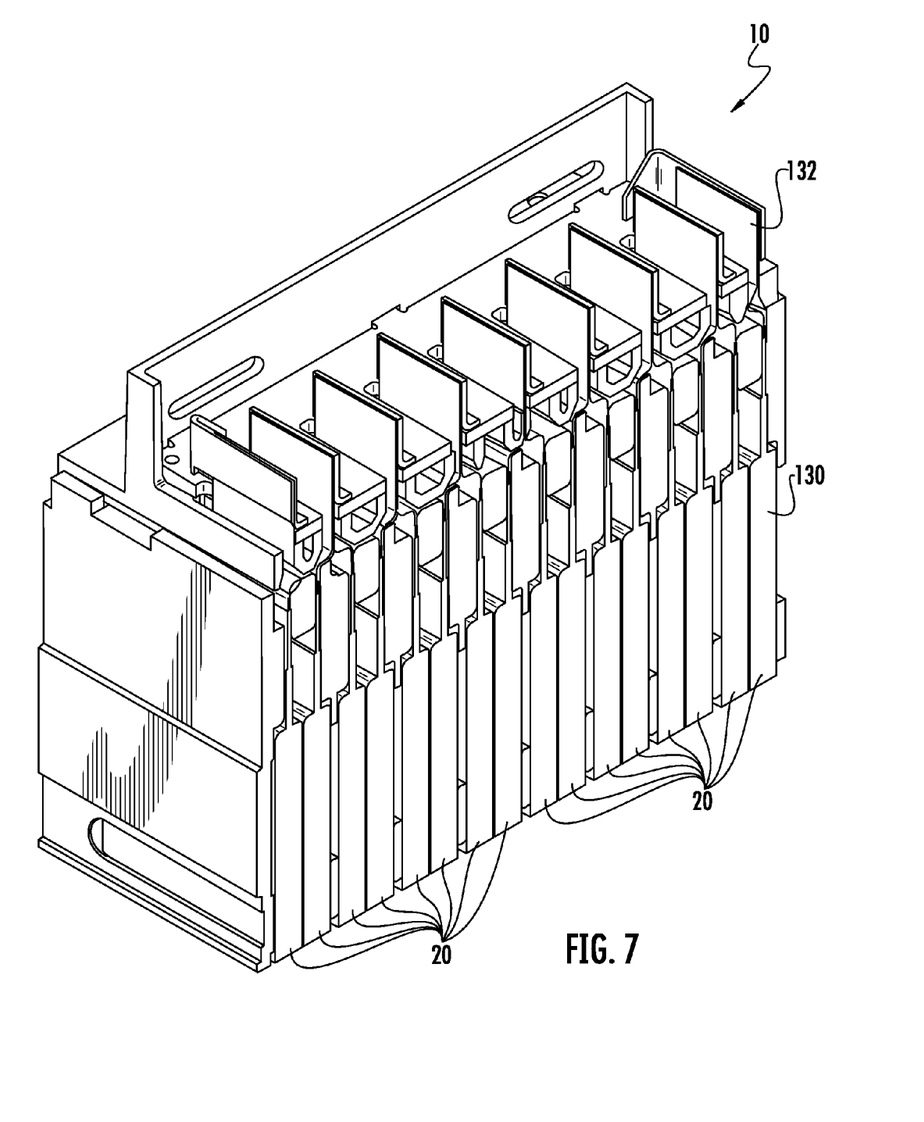
FIG. 7 is an enlarged cross-sectional view of the battery module of FIG. 3.
Figure 8:
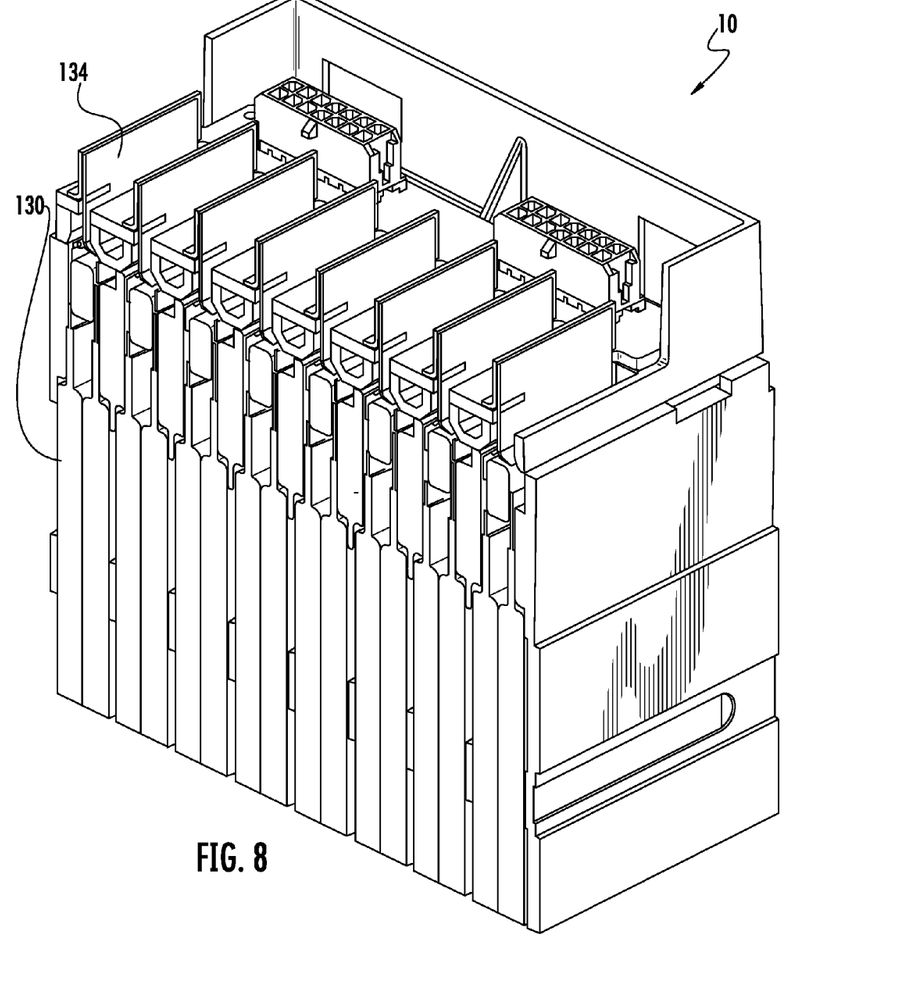
FIG. 8 is another enlarged cross-sectional view of the battery module of FIG. 3.

Referring to FIGS. 1 and 6, the plurality of frame members 50 are provided to couple the plurality of battery cells 20 together in a single assembly. In particular, the plurality of frame members 50 are coupled together and hold the battery cells 20 therebetween. In one exemplary embodiment, the plurality of frame members 50 are constructed of plastic.

Referring to FIGS. 2 and 9-12, the interconnect carrier 80 is configured to be coupled to a top portion of the plurality of frame members 50 and to hold the interconnect board 90 therein. The interconnect carrier 80 includes a base portion 230 and peripheral side walls 232, 234, 236, 238 coupled to the base portion 230. The base portion 230 has a plurality of apertures 250 extending therethrough. The interconnect carrier 80 is disposed between the plurality of battery cells 20 and the interconnect board 90 such that the electrical terminals (e.g., electrical terminals 132, 134) from the battery cells 20 extend through the plurality of apertures 250 of the interconnect carrier 80. In one exemplary embodiment, the interconnect carrier 80 is constructed of plastic.

Figure 9:
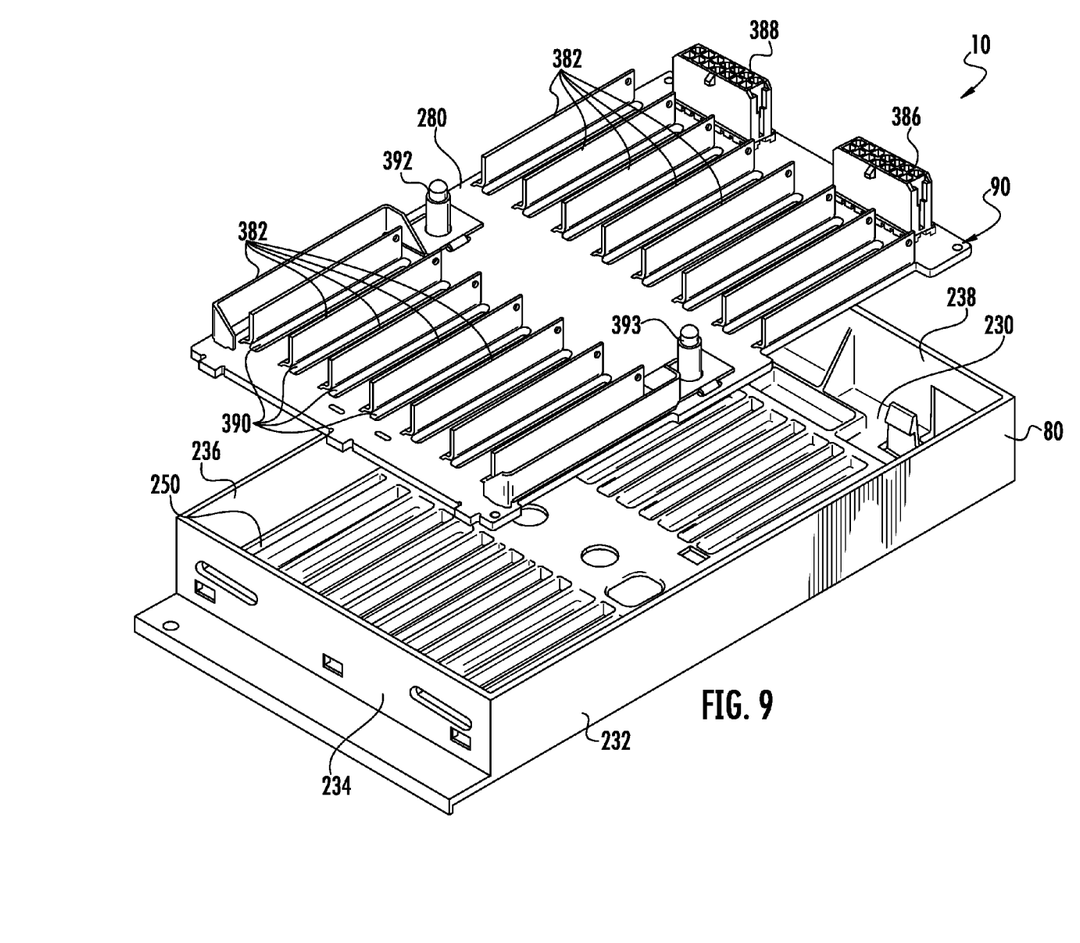
FIG. 9 is an exploded view of an interconnect carrier and an interconnect board utilized in the battery module of FIG. 1.
Figure 10:
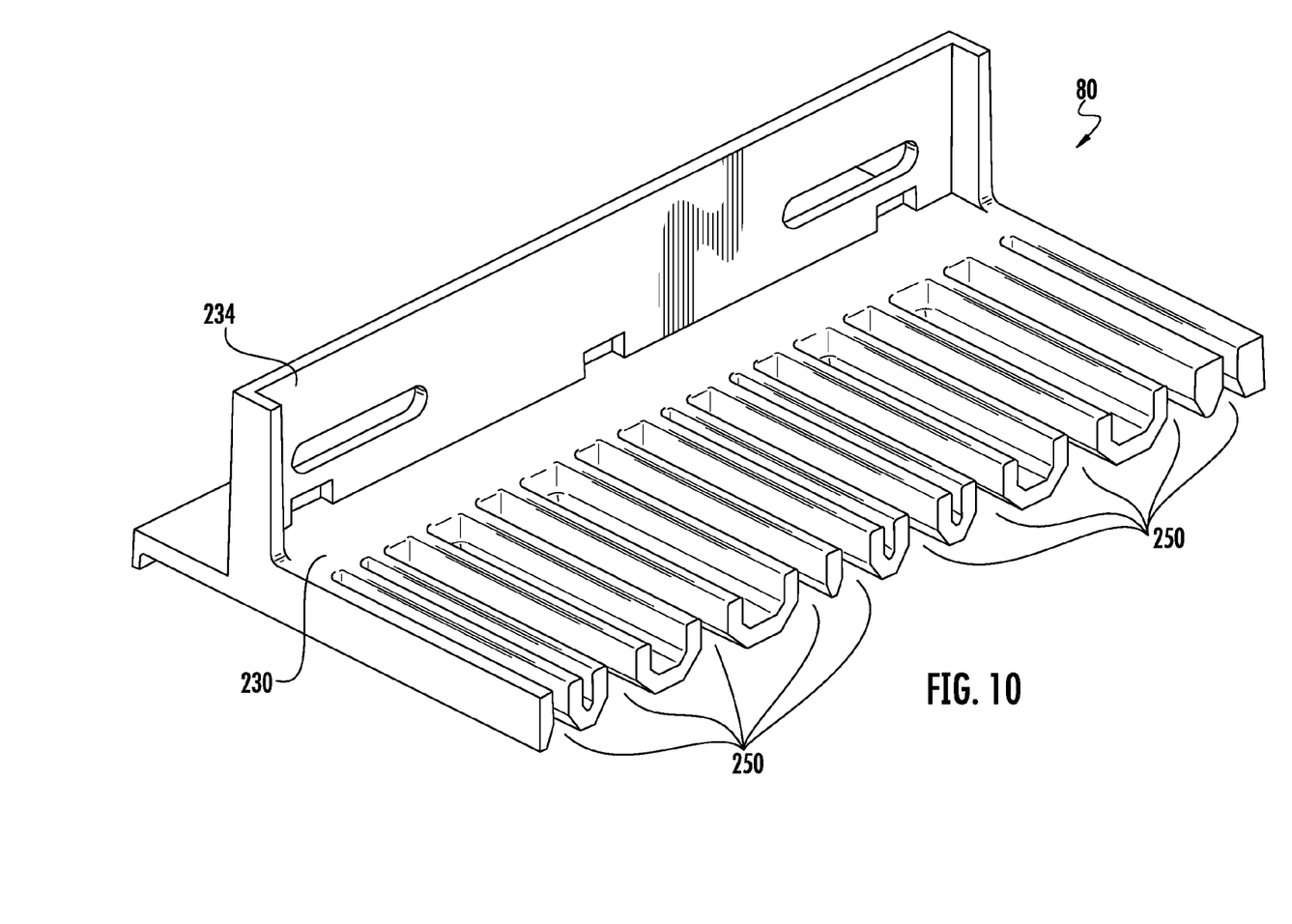
FIG. 10 is a cross-sectional view of an interconnect carrier utilized in the battery module of FIG. 1.
Figure 11:
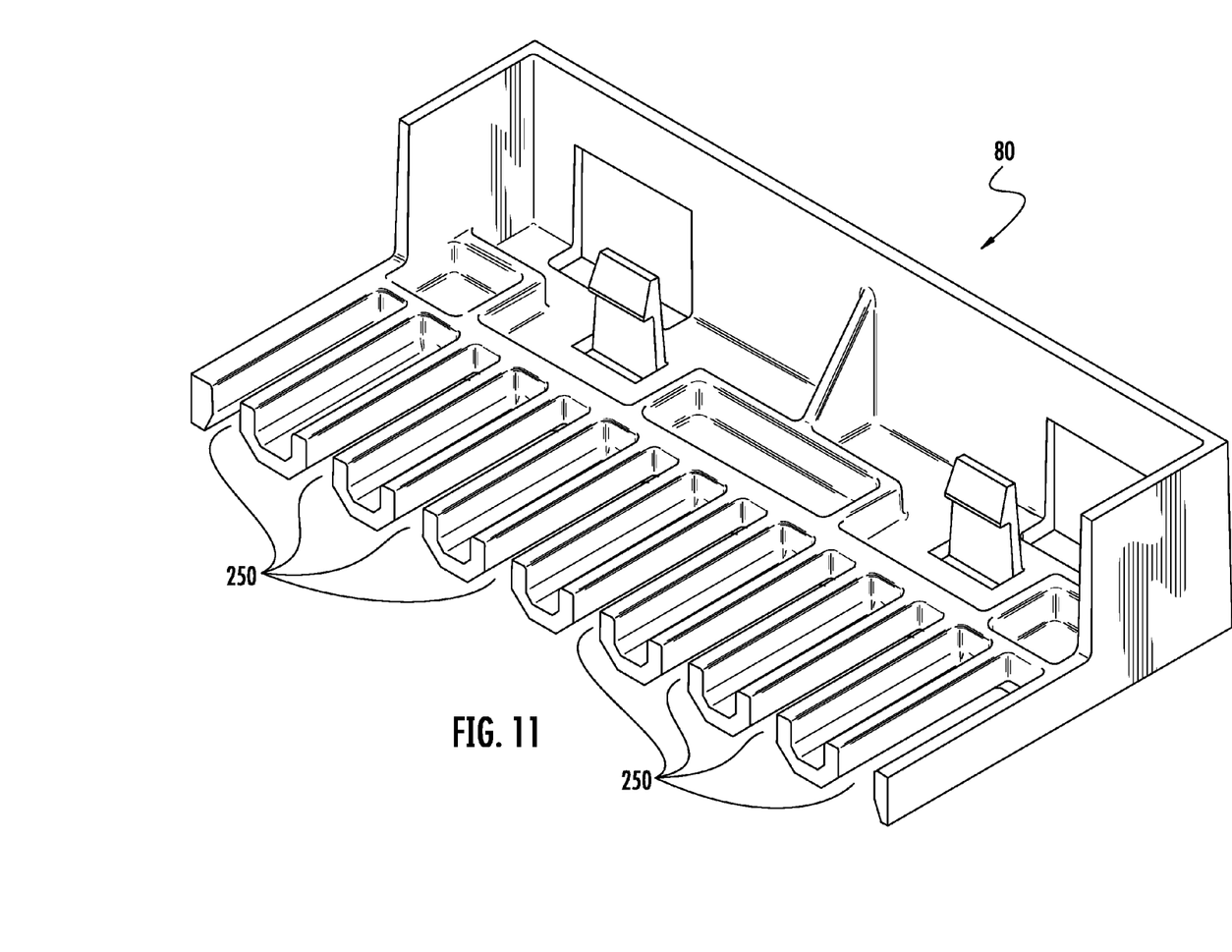
FIG. 11 is another cross-sectional view of the interconnect carrier utilized in the battery module of FIG. 1.
Figure 12:
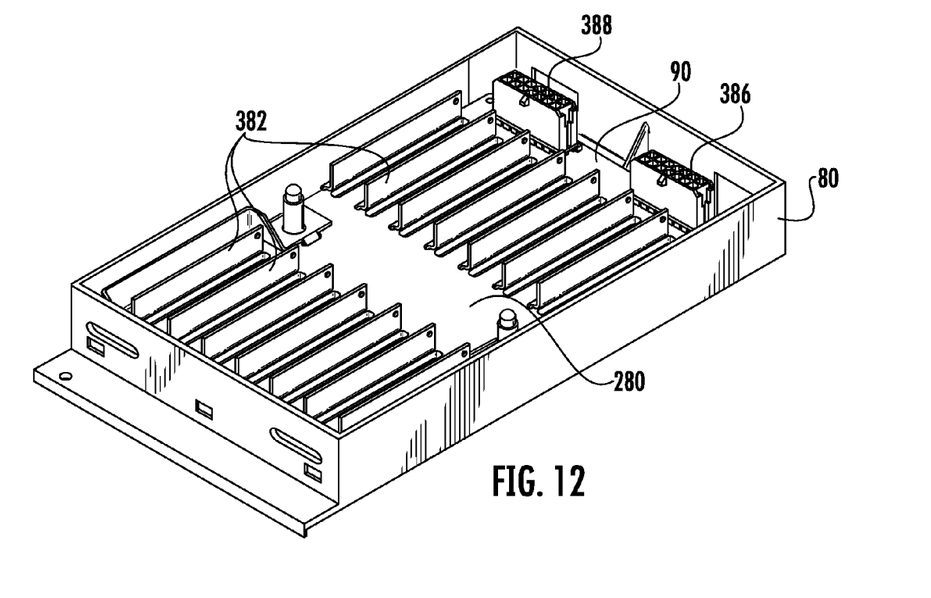
FIG. 12 is another schematic of the interconnect carrier and the interconnect board utilized in the battery module of FIG. 7.

The interconnect board 90 is provided to electrically couple together electrical terminals from the plurality of battery cells 20. The interconnect board 90 includes a circuit board 280, a plurality of interconnect members 382, first and second electrical connectors 386, 388, and first and second electrical posts 392, 393. The circuit board 280 has a plurality of apertures 390 extending therethrough for receiving the electrical terminals from the plurality of battery cells 20 therethrough. In particular, the electrical terminals from the plurality of battery cells 20 extend through the plurality of apertures 250 of the interconnect carrier 80, and further extend through the plurality of apertures 390 in the circuit board 280. Each of the plurality of interconnect members 382 are coupled to the circuit board 280 proximate to a respective aperture of the plurality of apertures 390. The interconnect members 382 are constructed of an electrically conductive metal or metal-alloy. Each of the plurality of interconnect members 382 are welded to respective electrical terminals of the plurality of battery cells 20. The first and second electrical connectors 386, 388 are coupled to the circuit board 280 and are electrically coupled to the plurality of interconnect members 382. The first and second electrical posts 392, 393 are electrically coupled to respective interconnect members disposed proximate to the first and second electrical posts 392, 393.

Referring to FIGS. 2, 4, 9 and 13, the elastomeric layer 100 is configured to prevent the potting compound 100 from contacting the battery portions or pouches of the plurality of battery cells 20. Also, the elastomeric layer 100 prevents the potting compound 100 from filling in air cooling channels between the battery cells 20. The elastomeric layer 100 has a flat portion 398 and a flange portion 399 coupled to the flat portion 398. The flat portion 398 includes a plurality of apertures 400 extending therethrough that have a size sufficient to allow the electrical terminals of the battery cells 20 to extend therethrough such that portions of the flat portion 398 proximate to the apertures 400 seal against an outer surface of the electrical terminals. The elastomeric layer 100 is disposed proximate to the interconnect board 90 between the peripheral side walls 232, 234, 236, 238 such that the electrical terminals from the plurality of battery cells 20 extend through the plurality of apertures 390 of the interconnect board 90 and further extend through the plurality of apertures 400 of the elastomeric layer 100. Peripheral sides of the elastomeric layer 100 seal against the peripheral walls 232, 234, 236, 238 of the interconnect carrier 80.

Figure 13:
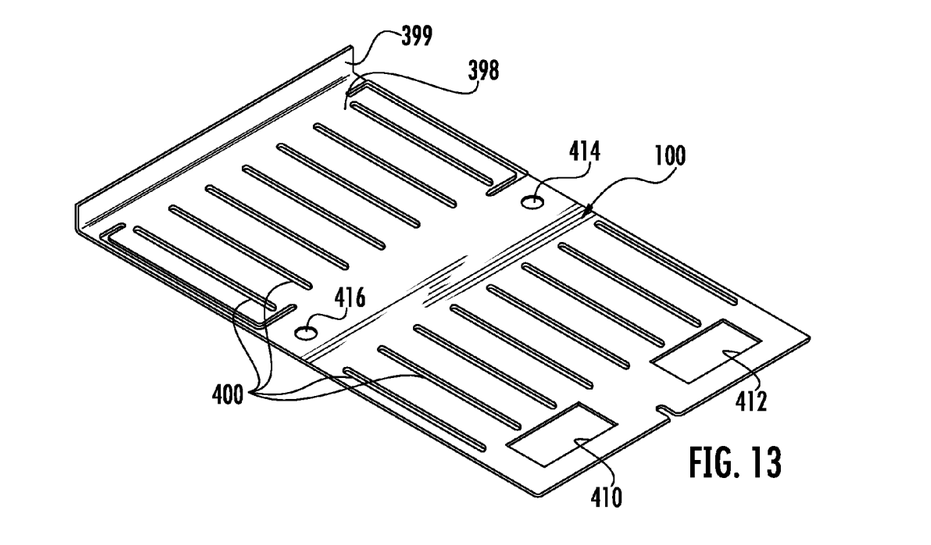
FIG. 13 is a schematic of an elastomeric layer utilized in the battery module of FIG. 1 in accordance with an exemplary embodiment.

The elastomeric layer 100 further includes apertures 410, 412, 414, 416 extending therethrough. The apertures 410, 412 are configured to receive the first and second electrical terminals 386, 388, respectively, therethrough. The apertures 414, 416 are configured to receive the electrical posts 392, 393, respectively, therethrough. In one exemplary embodiment, the elastomeric layer 100 is constructed of a rubber compound. In an alternative embodiment, the elastomeric layer 100 can be constructed of any elastomeric material known to those skilled in the art. In one exemplary embodiment, a thickness of the elastomeric layer 100 is 2 millimeters. Of course, in alternative embodiments, a thickness of the elastomeric layer 100 could be greater than 2 millimeters or less than 2 millimeters. The potting compound 110 is disposed on the elastomeric layer 100 such that the elastomeric layer 100 prevents the potting compound 110 from contacting the battery portions or pouches of the plurality of battery cells 20.

Referring to FIGS. 1, 3, 6 and 14, a flowchart of a method for manufacturing the battery module 10 in accordance with another exemplary embodiment will now be explained.

Figure 14:
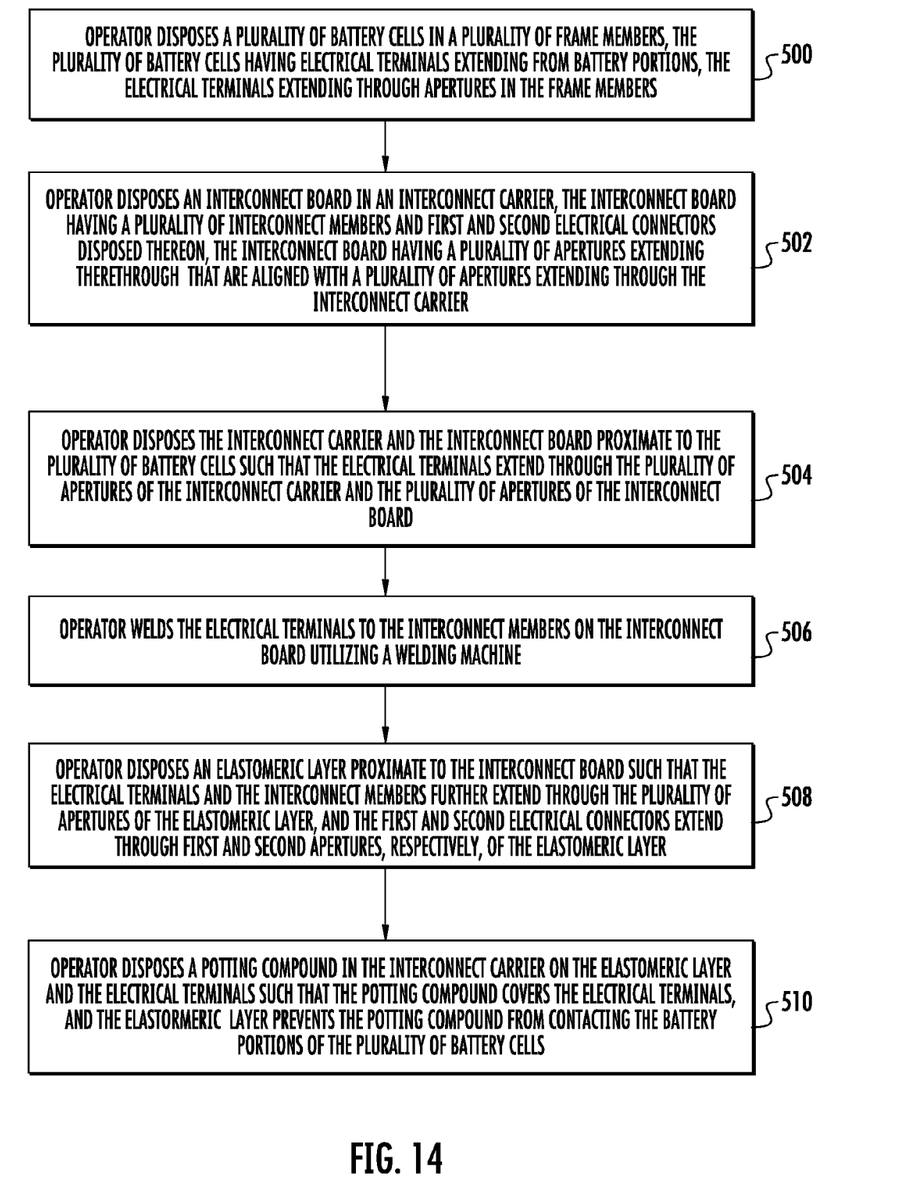
FIG. 14 is a flowchart of a method of manufacturing the battery module of FIG. 1. in accordance with another exemplary embodiment.

At step 500, an operator disposes the plurality of battery cells 20 in the plurality of frame members 50. The plurality of battery cells 20 have electrical terminals extending from battery portions thereof. The electrical terminals extend through apertures in the frame members 50.

At step 502, the operator disposes an interconnect board 90 in an interconnect carrier 80. The interconnect board 90 has a plurality of interconnect members 382 and the first and second electrical connectors 386, 388 disposed thereon and coupled thereto. The interconnect board 90 has a plurality of apertures 390 extending therethrough that are aligned with the plurality of apertures 250 extending through the interconnect carrier 80.

At step 504, the operator disposes the interconnect carrier 80 and the interconnect board 90 proximate to the plurality of battery cells 20 such that the electrical terminals extend through the plurality of apertures 250 of the interconnect carrier 80 and the plurality of apertures of the interconnect board 90.

At step 506, the operator welds the electrical terminals to the interconnect members 382 on the interconnect board 90 utilizing a welding machine 520.

At step 508, the operator disposes the elastomeric layer 100 proximate to the interconnect board 90 such that the electrical terminals further extend through the plurality of apertures 400 of the elastomeric layer 100, and the first and second electrical connectors 386, 388 extend through first and second apertures 410, 412, respectively, of the elastomeric layer 100.

At step 510, the operator disposes the potting compound 110 in the interconnect carrier 80 on the elastomeric layer 100 and the electrical terminals such that the potting compound 110 covers the electrical terminals and the elastomeric layer 100 prevents the potting compound 110 from contacting the battery portions of the plurality of battery cells 20.

The battery module 10 and the method of manufacturing the battery module 10 provide a substantial advantage over other battery modules and methods. In particular, the battery module 10 and the method provide a technical effect of utilizing an elastomeric member 100 to prevent a potting compounds from contacting battery portions or pouches of battery cells.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

I claim:

1. A battery module, comprising:
    a plurality of battery cells having electrical terminals extending from battery portions;
    an interconnect board having a circuit board with plurality of apertures extending therethrough for receiving the electrical terminals therethrough, the interconnect board further having a plurality of electrically conductive interconnect members coupled to and extending from the circuit board, at least one electrically conductive interconnect member of the plurality of electrically conductive interconnect members being coupled to an electrical terminal of the electrical terminals;
    an elastomeric layer having a plurality of apertures extending therethrough, the elastomeric layer disposed proximate to the circuit board such that the electrical terminals extend through the plurality of apertures of the circuit board and further extend through the plurality of apertures of the elastomeric layer; and
    a potting compound disposed on the elastomeric layer such that the elastomeric layer prevents the potting compound from contacting the battery portions.

2. The battery module of claim 1, further comprising:
an interconnect carrier having a plurality of apertures extending therethrough, the interconnect carrier disposed between the plurality of battery cells and the circuit board such that the electrical terminals extend through the plurality of apertures of the interconnect carrier, and further extend through the plurality of apertures of the circuit board, and further extend through the plurality of apertures of the elastomeric layer.

3. The battery module of claim 2, wherein the circuit board is a substantially rectangular-shaped circuit board that is sized to be entirely received within a region defined by the base portion and peripheral side walls of the interconnect carrier.

4. The battery module of claim 1, wherein the interconnect carrier includes a base portion and peripheral side walls coupled to the base portion that hold the potting compound therein.

5. The battery module of claim 1, wherein the circuit board further includes an electrical connector extending therefrom, and the elastomeric layer has an additional aperture configured to receive the electrical connector therethrough.

6. The battery module of claim 1, wherein the elastomeric layer is constructed of a rubber compound.

7. A method of manufacturing a battery module, comprising:
disposing a plurality of battery cells in a plurality of frame members, the plurality of battery cells having electrical terminals extending from battery portions, the electrical terminals extending through apertures in the frame members;
providing an interconnect board having a circuit board with plurality of apertures extending therethrough for receiving the electrical terminals therethrough, the interconnect board further having a plurality of electrically conductive interconnect members being coupled to and extending from the circuit board, the plurality of electrically conductive interconnect members being coupled to the electrical terminals;
disposing an elastomeric layer proximate to the circuit board such that the electrical terminals extending through the plurality of apertures of the circuit board further extend through a plurality of apertures of the elastomeric layer; and
disposing a potting compound on the elastomeric layer and the electrical terminals such that the elastomeric layer prevents the potting compound from contacting the battery portions.

8. The method of claim 7, further comprising:
disposing an interconnect carrier on the circuit board such that the interconnect carrier is disposed between the plurality of battery cells and the circuit board wherein the electrical terminals extend through the plurality of apertures of the interconnect carrier, and further extend through the plurality of apertures of the circuit board, and further extend through the plurality of apertures of the elastomeric layer.

9. The method of claim 7, wherein disposing the potting compound on the elastomeric layer and the electrical terminals includes disposing the potting compound within a region defined by peripheral walls of the interconnect carrier.

10. The method of claim 7, wherein the elastomeric layer is constructed of a rubber compound.

11. A battery module, comprising:
a plurality of battery cells having electrical terminals extending from battery portions;
an interconnect carrier disposed on the plurality of battery cells, the interconnect carrier having a base portion and peripheral side walls coupled to and extending from a first side of the base portion, the base portion having a plurality of apertures extending therethrough;
an interconnect board disposed on the base portion of the interconnect carrier, the interconnect board having a plurality of apertures extending therethrough, the interconnect board being sized and shaped to be entirely received within a region defined by the base portion and peripheral side walls of the interconnect carrier;
an elastomeric layer disposed on the interconnect board, the elastomeric layer having a plurality of apertures extending therethrough, such that the electrical terminals extend through the plurality of apertures of the interconnect carrier, and further extend through the plurality of apertures of the interconnect board, and further extend through the plurality of apertures of the elastomeric layer; and
a potting compound disposed on the elastomeric layer, the elastomeric layer configured to prevent the potting compound from contacting the battery portions.

12. The battery module of claim 11, wherein the base portion and the peripheral side walls of the interconnect carrier hold the potting compound therein.

13. The battery module of claim 11, further comprising a plurality of interconnect members disposed on the interconnect board, the plurality of interconnect members coupled to the plurality of electrical terminals.

* * * * *